(12) United States Patent
Westman et al.

(10) Patent No.: US 8,127,016 B2
(45) Date of Patent: Feb. 28, 2012

(54) TECHNIQUES FOR HIDING NETWORK ELEMENT NAMES AND ADDRESSES

(75) Inventors: Ilkka Westman, Helsinki (FI); Stefano Faccin, Dallas, TX (US); Risto Kauppinen, Espoo (FI)

(73) Assignee: Nokia Corporation, Espoo (FI)

( * ) Notice: Subject to any disclaimer, the term of this patent is extended or adjusted under 35 U.S.C. 154(b) by 595 days.

(21) Appl. No.: 10/398,867

(22) PCT Filed: Oct. 10, 2001

(86) PCT No.: PCT/IB01/01896
§ 371 (c)(1),
(2), (4) Date: Jul. 18, 2005

(87) PCT Pub. No.: WO02/32050
PCT Pub. Date: Apr. 18, 2002

(65) Prior Publication Data
US 2006/0155871 A1   Jul. 13, 2006

(51) Int. Cl.
*G06F 15/16* (2006.01)
(52) U.S. Cl. ........ 709/227; 709/200; 709/203; 709/228; 709/229; 370/349; 370/355; 370/356
(58) Field of Classification Search .................. 709/236, 709/200, 203, 227, 228, 229; 370/469, 349, 370/352, 355, 356
See application file for complete search history.

(56) References Cited

U.S. PATENT DOCUMENTS

| | | | | |
|---|---|---|---|---|
| 5,812,670 A * | 9/1998 | Micali | ............ | 705/74 |
| 6,081,900 A * | 6/2000 | Subramaniam et al. | ......... | 726/19 |
| 6,397,259 B1 * | 5/2002 | Lincke et al. | ................ | 709/236 |
| 6,499,108 B1 * | 12/2002 | Johnson | ............................ | 726/7 |
| 6,614,809 B1 * | 9/2003 | Verma et al. | .................. | 370/469 |
| 7,317,717 B2 * | 1/2008 | Pankajakshan et al. | ...... | 370/352 |
| 7,539,770 B2 * | 5/2009 | Meier | .......................... | 709/236 |
| 7,890,612 B2 * | 2/2011 | Todd et al. | .................... | 709/220 |
| 7,953,869 B2 * | 5/2011 | Demmer et al. | ............. | 709/228 |
| 7,961,623 B2 * | 6/2011 | Riley | ............................ | 370/236 |

(Continued)

FOREIGN PATENT DOCUMENTS
WO   WO 01/13601   * 2/2001

OTHER PUBLICATIONS

3rd Generation Partnershp Project; Technical Specification Group Services and System Aspects; Architecture Principles for -Release 2000 (Release 2000), 3G TR 23.821 V1.0.1 (Jul. 2000), 62 pgs.

(Continued)

*Primary Examiner* — Thu Ha Nguyen
(74) *Attorney, Agent, or Firm* — Harrington & Smith

(57) ABSTRACT

A technique for hiding network element names and addresses in communications between first and second networks includes providing a message generated by a network entity in the first network to be delivered to a target network entity in the second network, the messaging including first and second parts. The message generated by the network entity in the first network is routed to a contact point disposed between the first and second networks in accordance with the first part of the message and the message generated by the network entity in the first network is routed from the contact point to the target network entity in the second network in accordance with the second part of the message.

28 Claims, 10 Drawing Sheets

A. UE registration, S-CSCF in visited network

U.S. PATENT DOCUMENTS

| | | | |
|---|---|---|---|
| 2001/0049790 A1* | 12/2001 | Faccin et al. | 713/185 |
| 2001/0054158 A1* | 12/2001 | Jarosz | 713/201 |
| 2002/0056001 A1* | 5/2002 | Magee et al. | 709/225 |
| 2002/0065906 A1* | 5/2002 | Davidson et al. | 709/222 |
| 2002/0120749 A1* | 8/2002 | Widegren et al. | 709/227 |
| 2004/0230688 A1* | 11/2004 | Gbadegesin | 709/228 |
| 2005/0237982 A1* | 10/2005 | Pankajakshan et al. | 370/338 |
| 2006/0280179 A1* | 12/2006 | Meier | 370/389 |
| 2007/0261112 A1* | 11/2007 | Todd et al. | 726/11 |
| 2008/0071915 A1* | 3/2008 | Gbadegesin | 709/228 |
| 2008/0196098 A1* | 8/2008 | Cottrell et al. | 726/12 |
| 2008/0288647 A1* | 11/2008 | Gbadegesin | 709/228 |
| 2008/0320151 A1* | 12/2008 | McCanne et al. | 709/228 |
| 2009/0013399 A1* | 1/2009 | Cottrell et al. | 726/12 |
| 2011/0055552 A1* | 3/2011 | Francis et al. | 713/153 |

OTHER PUBLICATIONS

"Call Flow Definitions", AT&T, TSG-SA WG2 (S2-001449), Sep. 2000, 44 pgs.

"Uniform Resource Identifiers (URI): Generic Syntax", T. Berners-Lee et al., RFC 2396, Aug. 1998, 40 pgs.

"SIP: Session Initiation Protocol", M. Handley et al., RFC 2543, Mar. 1999, 153 pgs.

* cited by examiner

Registration to visited network

A. UE registration, S-CSCF in visited network

TECHNIQUES FOR HIDING NETWORK ELEMENT NAMES AND ADDRESSES

TECHNICAL FIELD

The present invention relates to hiding the configuration of a network with hiding names and/or addresses of network elements in communications between networks. More particularly, the present invention relates to hiding names and IP addresses in 3GPP (Third Generation Partnership Program) IP multimedia networks and UMTS (Universal Mobile Telecommunications Systems) networks.

The terminology in this application is changed compared to the Provisional Application to be more consistent with the 3GPP standardization without changing the scope of the invention. The main differences in the words used of the same concepts in this application and in the Provisional Application are presented in the following three column table:

| Word used of the concept in this application: | Word(s) used of the same concept in the Provisional Application: | Definition: |
| --- | --- | --- |
| "name" | "address" or "logical address" | input of the name to address resolution |
| "address" | "IP address" | result of the name to address resolution |

DNS (Domain Name System) may be used as name to address resolution mechanism.

Also the names of the alternative solutions or embodiments of the invention are changed in this application compared to the Provisional Application according to the following two column table without changing the scope of the invention. In the Provisional Application the solutions were also enumerated as alternatives. The alternative numbers are marked in the table with abbreviation "ALT".

| Name in this application: | Name in the slide set of Provisional Application: |
| --- | --- |
| Double semantics | Double semantics (ALT2) (not changed) |
| Two names for routing | Two addresses for routing (ALT3) |
| One name for two routings | One address—two routings (ALT6) |
| Partly encrypted name address pair | Partly encrypted address pair (ALT7) |
| Double semantics with encryption | Double semantics with encryption (ALT8) (not changed) |

Two names for routing with encryption Two addresses for routing with encryption (ALT9) One name for two routings with encryption One address—two routings with encryption (ALT10)

BACKGROUND ART

When a subscriber is registered at a foreign network, such as an IP (Internet Protocol) multimedia network, the home HSS (Home Subscriber Server) normally knows the address of the S-CSCF (Serving Call State Control Function) where the subscriber is registered Since it is desirable to hide the networks, except for the contact points which are usually I-CSCFs (Interrogating Call State Control Functions), the foreign network cannot give the name and/or address of the S-CSCF to the home HSS.

One proposed solution is that the HSS query should also be used in the visited network to locate the S-CSCF while another proposed solution is that the association between the subscriber and the name and/or address of the S-CSCF should be found from the I-CSCF. Locating the associations in the I-CSCF would require a new functionality in the I-CSCF. If the HSS contains the associations, it would result in the records of foreign subscribers being stored in the HSS. This would disturb the structure of the HSS in that it was designed to only store the records of its own subscribers. In addition, the HSS must also include the address of the APSE (Application Server). If the home operator does not want the address of the APSE available to other operators, a mechanism is needed to refer to the APSE.

Furthermore, in the visited network model, as noted above, the name and/or IP address of the S-CSCF are revealed during the registration to the home HSS when the S-CSCF requests the profile of the roaming subscriber from the home HSS of the subscriber. In addition, the IP address of the S-CSCF is also revealed in the originating and terminating call cases to/from new operators because the name, i.e. the FQDN (Fully Qualified Domain Name) of the S-CSCF has to be publicly resolvable.

In the home network model, the name and the IP address of the P-CSCF (Proxy CSCF, that is, the initial proxy in the home model) are revealed to the I-CSCF of the home operator during the registration when the P-CSCF sends a REGISTER message to the home I-CSCF of the roaming subscriber. The name and the IP address of the S-CSCF in the home network are revealed in originating and, depending on routing, possibly also in terminating call cases to new operators.

Lastly, in 3GPP IP multimedia network, there is an actual requirement to hide the internal structure of the network with respect to other networks. This implies that the names and the IP addresses of network elements, such as the S-CSCF shall not be made known to other networks.

It has been proposed that the HSS in a visited network behave as a VLS (Visited Location Server) to handle (that is, to select at registration and store for MT call routing) the identity of the S-CSCF in the visited network in order to mask the identity of the S-CSCFv (Serving CSCF in the visited network) to the home network. The VLS will be interrogated by the I-CSCFv (Interrogating CSCF in the visited network) when an MT (mobile terminating) call is routed to it by the home network. However, in such a solution, the visited network must maintain a relationship through some mechanism between the identity of the roaming subscriber and the HSSv (HSS in the visited network) that stores the identity of the S-CSCF. In addition, the relationship must be available to all I-CSCFv's since the I-CSCFv that receives the MT call routed from the home network cannot be decided nor predicted in advance.

DISCLOSURE OF INVENTION

In the present invention, an indirect reference addressing mechanism is used to hide the names and the IP addresses in both the visited network model and in the home network model both with the S-CSCF in the home network and with the S-CSCF in the visited network. In the present invention, the contact points between networks, e.g. I-CSCFs, are not hidden. The IP addresses as well as the names e.g. FQDNs of all of the other network elements remain hidden. The present invention provides a solution to the problem of how to find the S-CSCF so that the address of the S-CSCF is not revealed to other network operators. Furthermore, the present invention allows the hiding of the names and addresses of the HSSs and P-CSCFs. One solution in accordance with the present invention is to identify the S-CSCF with an address pair in which the first part is the address of the I-CSCF and the second part is the encrypted address of the S-CSCF itself.

In accordance with the present invention, the address of the S-CSCF is hidden from other networks by the adoption of a name assigned to the S-CSCF and translatable by the DNS (Domain Name Service) to the address of the S-CSCF only when the DNS query is performed by a network element belonging to the same network as S-CSCF.

Accordingly, an object of the present invention is to provide a method of hiding at least one of network element names and addresses in communications between fist and second networks, the method including:
  providing a message generated by a network entity in the first network to be delivered to a target network entity in the second network, the message comprising first and second parts;
  routing the message generated by the network entity in the first network to a contact point disposed between the first and second networks in accordance with the first part of the message; and
  routing the message generated by the network entity in the first network from the contact point to the target network entity in the second network in accordance with the second part of the message.

Another object of the present invention is to provide a communication system including:
  a first network including a network entity disposed therein;
  a second network including a target network entity disposed therein; and
  a contact point disposed between said first and second networks;
  wherein, upon said network entity generating a message comprising first and second parts to be delivered to said target network entity, said message is routed to said contact point in accordance with said first part of said message and then routed from said contact point to said target network entity in accordance with said second part of said message.

Furthermore, still another object of the invention is to provide a contact point apparatus in a system including a first network having a network entity disposed therein and a second network including a target network entity disposed therein, the network entity in the first network generating a message having first and second parts to the target network entity in the second network, the contact point being disposed between said first and second networks and including:
  a means for receiving the message generated by the network entity in the first network, the message being routed to the contact point in accordance with the first part of the message; and
  a means for routing the message generated by the network entity in the first network to the target network entity in the second network in accordance with the second part of the message.

A contact point of a network is a specialized network entity or an ordinary network entity with the functionality needed to route further the incoming messages from outside the network to the target network entities, and to route further the outgoing messages from the network entities keeping hidden the names and/or addresses of the network entities. Thus the contact point does not need to be a complete network element.

The contact point may comprise e.g. one of an I-CSCF (Interrogating Call State Control Function) or a P-CSCF (Proxy-Call State Control Function) or a BGCF (Breakout Gateway Control Function) or be a functionality in these network elements.

A hidden network is a network where names and/or addresses are not available and/or not usable, e.g. for routing, outside the network with exception of the names and/or addresses of the so called contact point(s) that is/are the only access point(s) to the network from outside of the network.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same as by way of illustration and example only and that the invention is not limited thereto. This spirit and scope of the present invention are limited only by the terms of the appended claims.

The following represents brief descriptions of the drawings, wherein.

BEST MODE FOR CARRYING OUT THE INVENTION

As noted above, in the present invention, an indirect reference addressing mechanism is used to hide the names and addresses in both the visited network model and in the home network model with the S-CSCF in the visited network and with the S-CSCF in the home network respectively. While the most of the examples discussed below described the visited network model with the S-CSCF in the visited network, it is of course understood that the solutions can also be applied to the home network model where the S-CSCF is in the home network.

In the indirect reference addressing mechanism, the message is routed to a contact point with the first part of the indirect reference. The contact point resolves the second part of the indirect reference and routes the message to the target network element. The network between the contact point and the target network element remains hidden. There are two basic mechanisms which can be used to hide the network, namely, an indirect reference to the hidden network to hide the address of the target network element or an indirect reference to the hidden network is partially encrypted to hide the name of the target network element.

Figure 1:
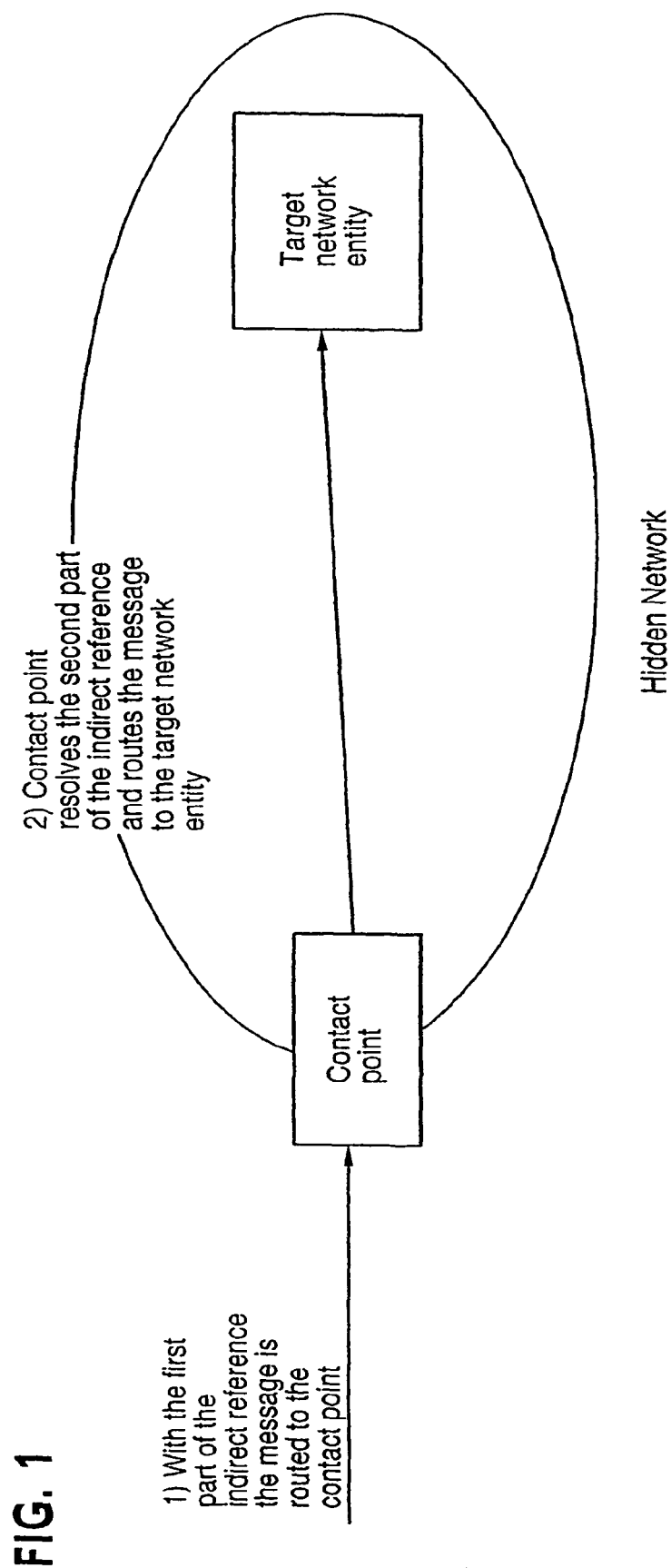
FIG. 1 illustrates a salient feature of the present invention.

FIG. 1 illustrates the salient feature of the present invention, namely, using the first part of the indirect reference, the message to be sent from a network entity in a first network to a target network entity in a second, hidden, network is routed from the network entity in the first network to the contact point disposed between the first network and the second, hidden, network. The contact point then resolves the second part of the indirect message and routes the message to the target network entity. For simplicity in the example in FIG. 1, a message is sent to a hidden network The invention also applies to all combinations, whether or not the source or target network is hidden.

More particularly, various mechanisms may be used to hide the address of the target element, namely, double semantics, two names for routing, and one name for two routings.

With regard to double semantics, all incoming and outgoing traffic is routed via contact points e.g. I-CSCFs. All network elements inside the home network can use only an internal DNS (Domain Name Service). All network elements outside of the home network can use only a public DNS. A contact point can use both the internal and the public DNS, namely, the contact point uses the internal DNS when a name of its own network has to be resolved and uses the public DNS when a name of a foreign network has to be resolved The name of a particular network element will be resolved to the IP address of a contact point, e.g. I-CSCF, when resolved in a foreign network and will be resolved to the IP address of the network element itself when resolved inside the network.

In the double semantics mechanism, the contact point, e.g. I-CSCF, has the capability to consult both the internal DNS and the public DNS depending on the name to be resolved and does not have to change incoming and outgoing messages. Furthermore, the S-CSCF and HSS and SPD require no extra functionality nor does any network element in the foreign networks. Still furthermore, a double DNS database is needed for names of the hidden network The first database is used in the internal DNS servers which are available only from inside the home network where as the second database is used in the public DNS servers available only from the foreign networks. Since the contact points are located on the border between the hidden network and the other networks, they can use both databases.

In the two names for routing mechanism, two names are used for routing, namely, a first name used to route the message to the network (that is, to the contact point) and a second name used to route the message inside the target network to the S-CSCF. In the foreign networks, only the first name can be resolved and not the second name where as in the home network, the second name can be resolved.

In the two names for routing mechanism, it will be necessary for 3GPP to define a new functionality for usage of two names e.g. in the SIP (Session Initiation Protocol) protocol. Furthermore in the visited network model, the HSS must store two names rather than one.

In the one name for two routings mechanism, all incoming and outgoing traffic is routed via contact points, e.g. I-CSCFs, as in the case of double semantics. One name is used for routing both in the hidden and other networks. In this mechanism, the single name is used for routing as is as well as being used in a modified format In this regard, there are two alternatives, namely, the name is modified in the hidden network before being used for routing (i.e. the name is home modified) or the name is modified in the other network before being-used for routing (i.e. the name is foreign modified). In the first alternative, there are two possible solutions, namely, the contact point e.g. an I-CSCF replaces the original name of the incoming message with a modified name or alternatively, the contact point e.g. the I-CSCF doesn't touch the original name of the incoming message and every network element modifies the original name for routing when needed. With regard to the DNS service, the name of a certain network element will be resolved to the IP address of the contact point e.g. I-CSCF when resolved outside the hidden network and resolved to the IP address of the network element itself when resolved inside the hidden network.

In the one name for two routings mechanism, no changes to the SIP or HSS are needed. In addition, the IP addresses of all of the elements with the exception of the contact point, e.g. I-CSCF, can be hidden using the same technique. In the first alternative (i.e. home modified) no standardization is needed while m the second alternative (i.e. foreign modified), the address modification must be standardized.

In a similar fashion, various mechanisms may be employed to hide the name of the target network element utilizing encryption, namely, a partially encrypted name address pair, double semantics with encryption, two names for routing with encryption, and one name for two routings with encryption. These mechanisms can be divided into non-absolute and absolute total hiding solutions depending on whether the encrypted name is, or is not, used as an argument in a DNS query outside of the hidden network.

In the case of the partially encrypted name address pair mechanism and the two names for routing with encryption mechanism, total hiding solutions are possible. The encrypted name is not used for a DNS query in foreign networks. The encrypted name is decoded before it is used in the hidden network. Thus there is no need to include the encrypted names in either the public DNS database or in the internal DNS database.

In the case of the double semantics with encryption mechanism and the one name for two routings with encryption mechanism, the encrypted name is used for a DNS query outside the hidden networks and accordingly, the encrypted name must be included in the public DNS database. If the encrypted name is also used for a DNS query in the hidden network, then the encrypted name has to be included in the internal DNS database. On the other hand, if the encrypted name is not used for a DNS query in the hidden network, then the encrypted name is decoded at the contact point, for example, an I-CSCF, prior to being used and accordingly, there is no need to include the encrypted names in the internal DNS database.

As to the scope of the encryption key used, the encryption key can be call leg specific, call specific, contact point specific, contact point type specific, or network wide. In the case of a call specific encryption key, the key may be generated from the call identity. In the case of a contact point specific encryption key, the incoming and outgoing traffic must pass via the same contact point that knows the encryption key. In the case of a contact point type specific encryption key, similar contact points use the same encryption key and in the case of a network wide encryption key, all of the contact points in the network utilize the same encryption key.

As to the scope of the encryption, a portion of the name or the entire name may be encrypted, for example, in the following ways: the hostname may be encrypted, the hostname and the domain name part may be encrypted while leaving the operator domain unencrypted, the hostname and the entire domain name may be encrypted, the entire name may be encrypted, the entire name may be encrypted except for the @ sign, or the entire address including the @ sign may be encrypted. Note that the characters of the encryption result are important if the result has to have the format of a valid name.

In the case of a partially encrypted name address pair, the total hiding is implemented using the name address pair. The name address pair is an indirect reference to a network element located inside a totally hidden network. The first part of the pair is the name or address of a contact point, for example, an I-CSCF, in the target network and the second part of the pair is the name or address of the target network element The second part of the pair is always encrypted outside of the home network. The name address pair is stored as a single address in the HSS and in the SPD. The via headers are encrypted.

With regard to the needed functionality in the case of a partially encrypted name address pair, the originator of the message in a foreign network may build the name or address from the name address pair by using the first part of the name address pair as a maddr parameter and using the second part of the name address pair as a Request-URI, that is, the Request-URI is an encrypted character string.

As to the network elements outside the hidden network, the message may be routed with the maddr parameter consistent with the SIP specification. With respect to name/address checking, either the validity of the Request-URI is not checked or the validity of the Request-URI is checked if the result of the encryption has a format of a valid name or address (to be used as the Request-URI).

With regard to the contact points, for example, I-CSCFs, in the target network, the maddr parameter of each incoming message is removed and the encrypted Request-URI is replaced by a decoded Request-URI. With respect to outgoing messages, the contact points ensure that all necessary names and addresses of the hidden network are in the format of a name address pair where the second part is encrypted. If needed the contact point, e.g. I-CSCF, encrypts the name or address, inserts the own name and builds the name address pair.

With regard to ordinary network elements in the target network, no extra functionality is needed with regard to routing since the messages are routed as usual with the Request-URI. As to name/address building, if the receiver is outside the hidden network, the home name/address in the address pair format (with the second part encrypted) is used. Alternatively, this address building functionality can be replaced by the above-noted functionality of the contact points.

As to name address pair building, if performed by the contact point, and ordinary network element of the hidden network does not have to build a name address pair when it wants to provide a name or an address that refers to itself. In addition, the scope of the encryption key can be smaller than network wide. If the name address pair building is performed by an ordinary network element, the contact point does not have to do anything to the outgoing message and the scope of the encryption key has to be network wide in the absence of an encryption key delivery system.

With regard to the double semantics with encryption mechanism, the concept corresponds to that of the double semantics mechanism where the name is encrypted and since the same encrypted name is used both outside an inside the network, it must be included in both the public and internal DNS databases. Outside the hidden network, the encrypted name is resolved to the IP address of the contact point while in the hidden network, the encrypted name is resolved to the IP address of the target network element.

A suitable scope of encryption for the double semantics with encryption mechanism is that the host name and the domain name part are encrypted while the operator_domain is unencrypted. Furthermore, other scopes of the encryption can be used and the encryption can also be a simple character string modification. The encryption interval can either be dynamic, static, extreme dynamic, extreme static, or a combination of dynamic and static encryption intervals.

With a dynamic encryption interval, the names of the network elements are encrypted all the time with new encryption keys and new encrypted names are added to DNS databases. The network elements and contact points always utilize a newly encrypted name when available and old encrypted names are not used and they are removed after a predetermined time period from the DNS databases. The lifetime of an encrypted name compared with the birth rate of new encrypted names defines the size of an encrypted name space and hiding is based on the encrypted name space which is changing all the time.

With a static encryption interval, a part or all of the names are always encrypted with a new key after a predetermined time interval and a part or all of the old names are removed. The amount of encrypted names can easily be defined and only a part or all of the encrypted names are used randomly or according to a specific algorithm Hiding is based on a sufficiently large encrypted name space.

With an extreme dynamic encryption interval, the name is encrypted individually every time it is needed with a new key and the encrypted name is inserted in both the public and internal DNS databases prior to use.

With an extreme static encryption interval, the names are encrypted and stored in both the public and internal DNS databases only once and are not changed after that. Hiding is based on a sufficiently large encrypted name space.

The functionality needed with the double semantics with encryption mechanism is the same as that needed with the double semantics mechanism with the added functionality of an encryption mechanism as well as dynamic or static DNS database handling.

The two names for routing with encryption mechanism corresponds to the two names for routing mechanism. The names of the network elements, for example the S-CSCF located inside the network, are normally encrypted at a contact point for outgoing messages and are normally decrypted at a contact point for incoming messages. The encrypted name is not utilized outside the hidden network nor is utilized within the hidden network. That is, the encrypted name is not included in either the public or internal DNS databases. The scope of the encryption can be chosen freely, e.g. only the part of the name may be encrypted or the entire name may be encrypted.

The functionality needed with the two names for routing with encryption mechanism is the same as that needed with the two names for routing mechanism with the added functionality of an encryption mechanism.

The one name with two routings with encryption mechanism corresponds to the one name with two routings mechanism where the name is encrypted. Everything that has been discussed with regard to the double semantics with encryption mechanism is also applicable to this mechanism with the exception that in the alternative in which the names modified in the home network prior to being used for routing, the encrypted name can be decoded or not decoded at the contact point. If it is decoded, it is not included in the internal DNS database while if it is not decoded, it is included in the internal DNS database after modification. In the alternative in which the names are modified in the foreign network prior to be used for routing, both the encrypted name and the encrypted name after modification are needed. The encrypted name as is included in the internal DNS database and the encrypted name after modification is included in the public DNS database.

The functionality needed for the one name with two routings with encryption mechanism is the same as that needed with the one name with two routings mechanism with the added functionality of an encryption mechanism and dynamic or static DNS database handling.

The above-noted examples are merely for exemplary purposes and the present invention is not limited thereto. For example, the SIP protocol is merely used as an example and the solutions are valid and can be applied to other call control protocols. The solutions can be applied also to other protocols and all types of networks where hiding of the names or addresses on the logical and/or lower-level is needed. The maddr parameter is simply a name or address used as a destination address for routing instead of the Request-URI if the maddr parameter exists while the Request-URI is simply a destination name or address used for routing if the maddr parameter does not exist The HSS is simply a location where the name or address of a network element in the hidden network is stored in the visited network model and the I-CSCF is merely a contact point connecting to the hidden network.

Furthermore, the solutions can be applied to any situation in which a host, located inside a hidden network, must be addressed from outside the network and the network itself is inaccessible except through a contact point or contact points. The contact point can be any applicable host or suitable network element in the target network having a connection to another network.

Still furthermore, as to the use of two separate DNS databases, the application can explicitly choose the resolver that utilizes specific DNS servers or the resolver can make a decision based on a given parameter, argument, etc., as to which DNS server it will use for the query in question That is, the resolver may utilize an internal DNS server for a name in its own network and utilize a public DNS server for foreign names.

Lastly, in the discussion above, an indication that a name is resolved to an IP address is equally applicable to a name being resolved to more than one IP address. In addition, a single contact point can have more than one IP address.

These concepts and abbreviations are used in the following figures:

UE_MSISDN is an identity of a subscriber e.g. E.164.

LN i.e. logical name is an identity of a subscriber e.g. john.doe@ims.sonera.fi.

APSE is an abbreviation for Application Server.

Figure 2:
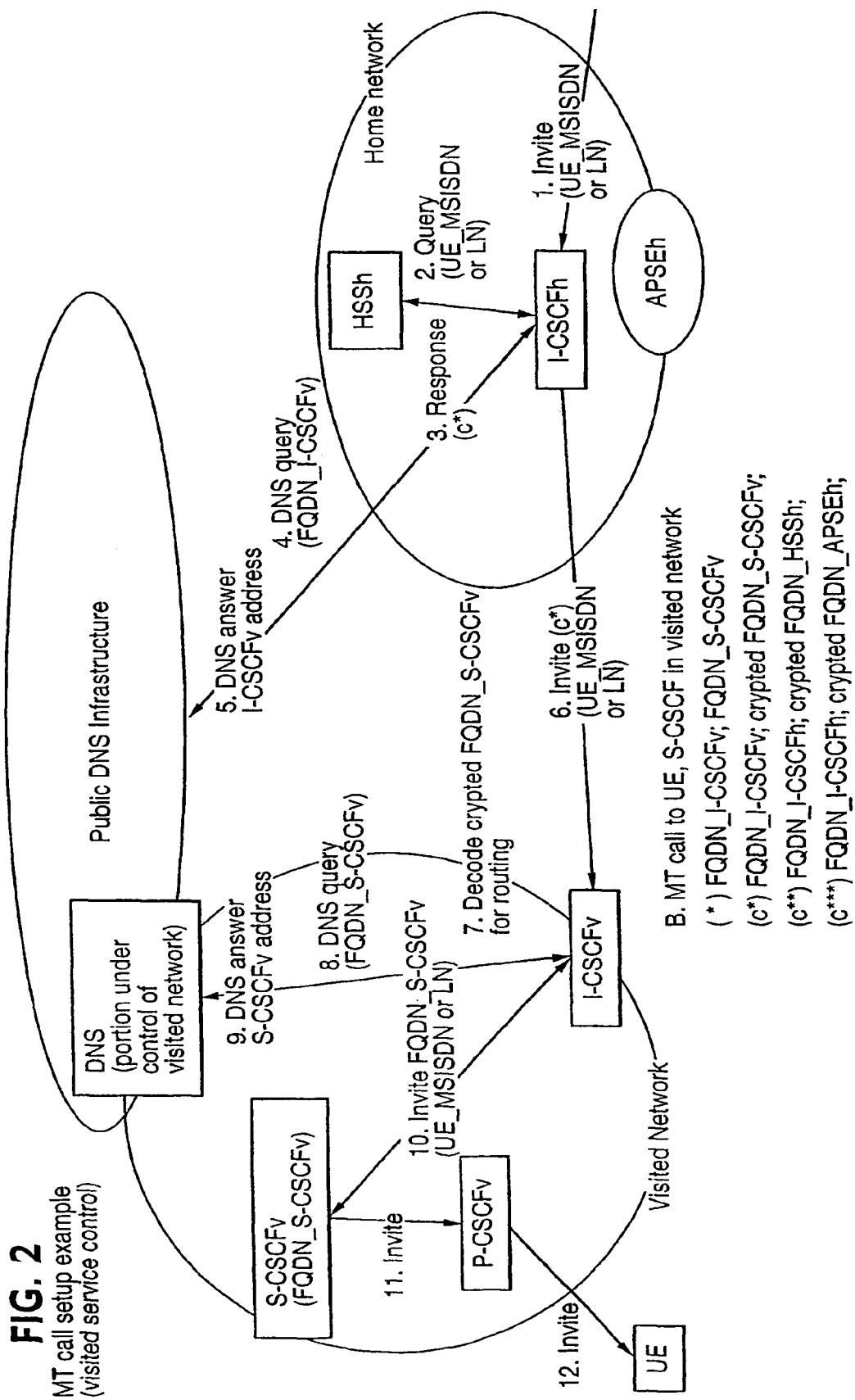
FIG. 2 illustrates a mobile terminal call setup example using the visited network model where the visited network is hidden utilizing the two names for routing with encryption mechanism.

FIG. 2 illustrates a mobile terminal call setup example using the visited network model where the visited network is hidden utilizing the two names for routing with encryption mechanism. As illustrated in FIG. 2, in step 1, an I-CSCFh receives an Invite and in response thereto, sends a Query to the HSSh in step 2 which in turn, in step 3, sends a Response (FQDN of I-CSCFv and encrypted FQDN of S-CSCFv) back to the I-CSCFh. In step 4, the I-CSCFh sends a DNS query in order to resolve FQDN of I-CSCFv to the Public DNS Infrastructure which in turn, in step 5, sends a DNS answer (IP address of I-CSCFv) back to the I-CSCFh. In step 6, the I-CSCFh sends using the IP address an Invite to an I-CSCFv of the visited network which, in step 7, decodes the encrypted FQDN of S-CSCFv for routing. In step 8, the I-CSCFv sends a DNS query in order to resolve FQDN of S-CSCFv to that portion of the Public DNS Infrastructure under control of the visited network which in turn sends a DNS answer (IP address (es) of S-CSCFv) back to the I-CSCFv in step 9. In step 10, the I-CSCFv sends using the IP address an Invite to a S-CSCFv which in turn, in step 11, sends the Invite to a P-CSCFv of the visited network which in turn sends the Invite to the target mobile terminal UE (User Equipment).

Figure 3:
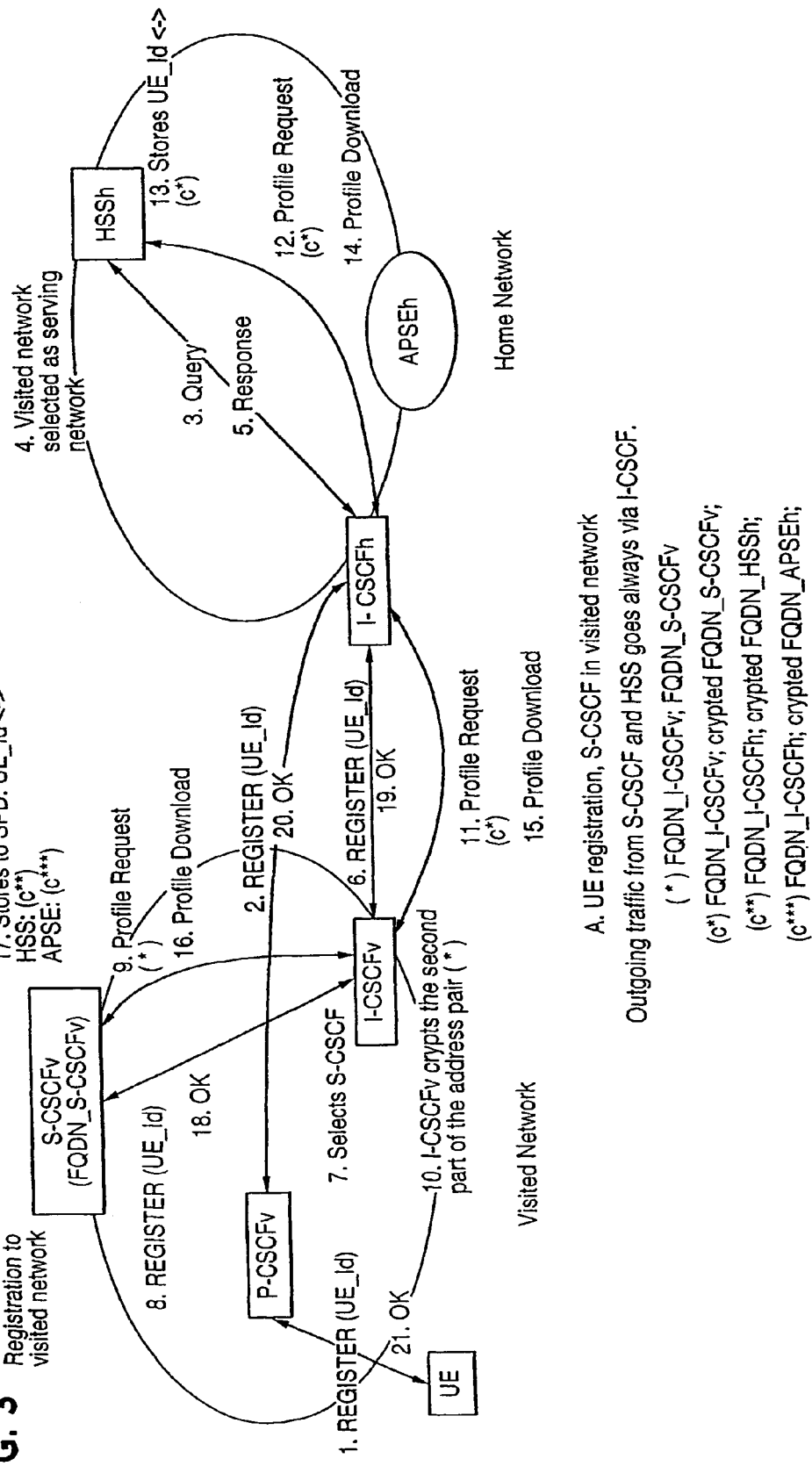
FIG. 3 illustrates registration of a mobile terminal to a visited network using the visited network model where the visited as well as the home network are hidden utilizing the two names for routing with encryption mechanism.

FIG. 3 illustrates registration of a mobile terminal to a visited network using the visited network model where the visited as well as the home network are hidden utilizing the two names for routing with encryption mechanist.

Figure 4:
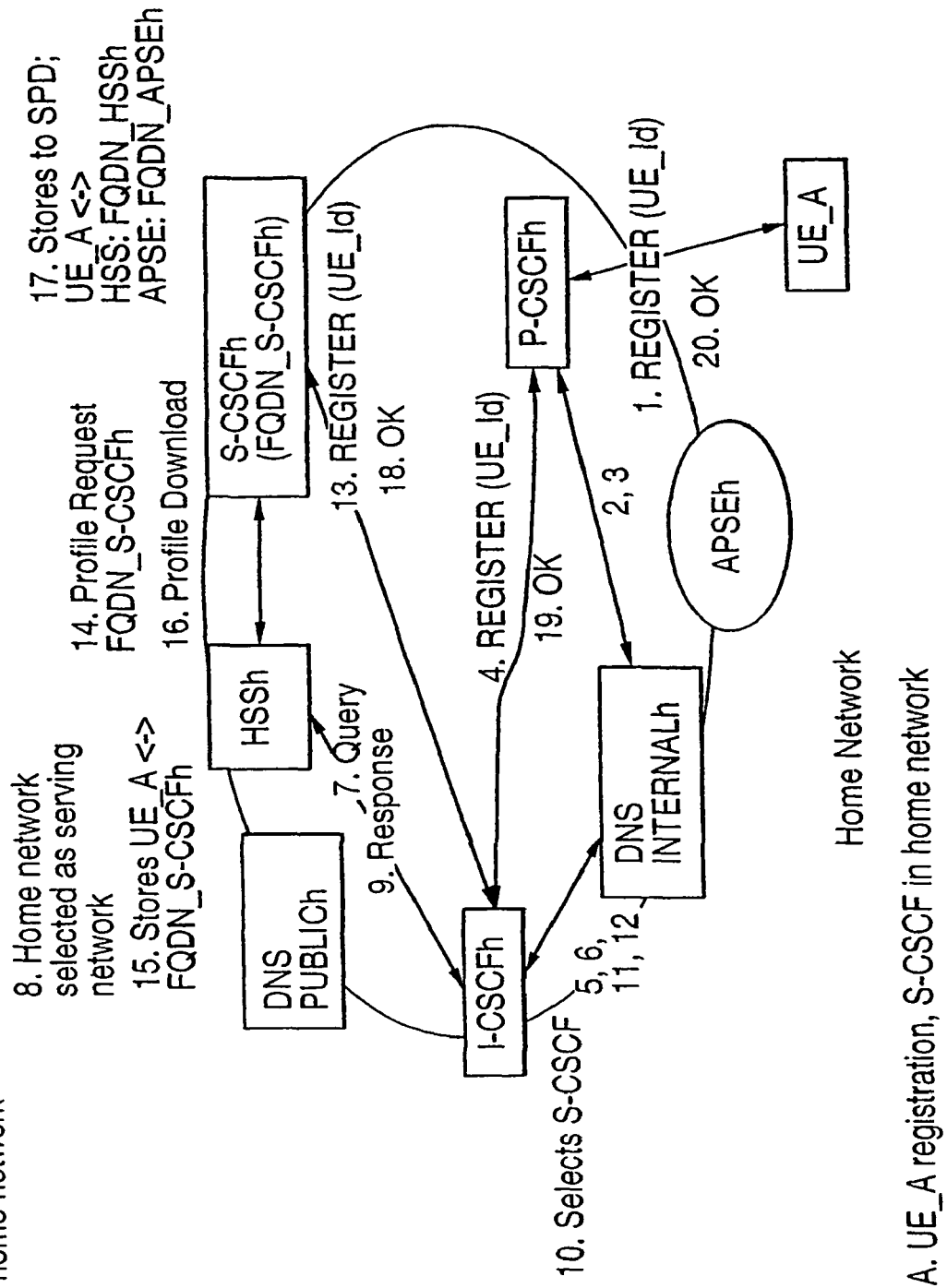
FIG. 4 illustrates the registration to a home network by a mobile terminal when the S-CSCFh is in the home network, i.e. the home network model is used, and the home network is hidden utilizing the double semantics mechanism.

FIG. 4 illustrates the registration to a home network by a mobile terminal when the S-CSCFh is in the home network, i.e. the home network model is used, and the home network is hidden utilizing the double semantics mechanism.

Figure 5:
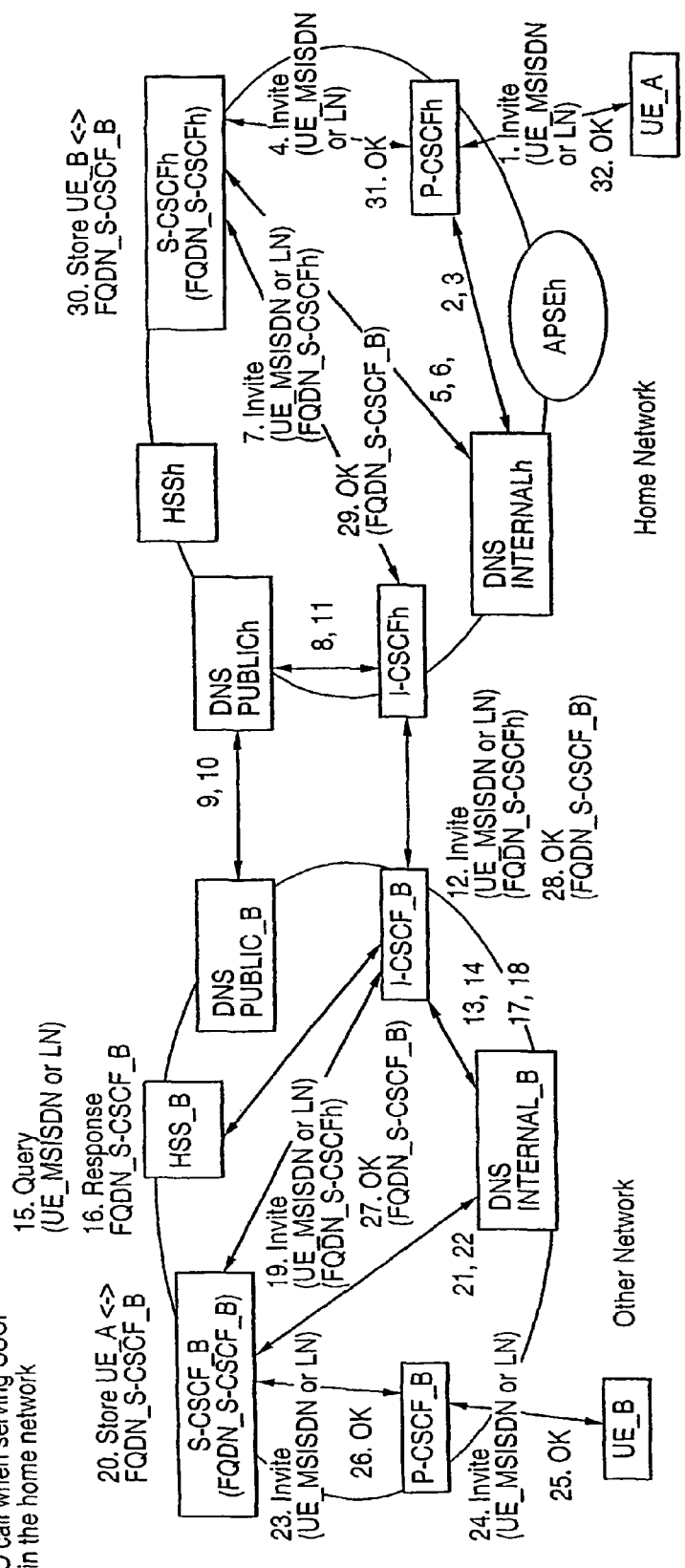
FIG. 5 illustrates a mobile originated call when the S-CSCFh is in the home network, i.e. the home network model is used, and both the home as well as the other network are hidden utilizing the double semantics mechanism.

FIG. 5 illustrates a mobile originated call when the S-CSCFh is in the home network, i.e. the home network model is used, and both the home as well as the other network are hidden utilizing the double semantics mechanism.

Figure 6:
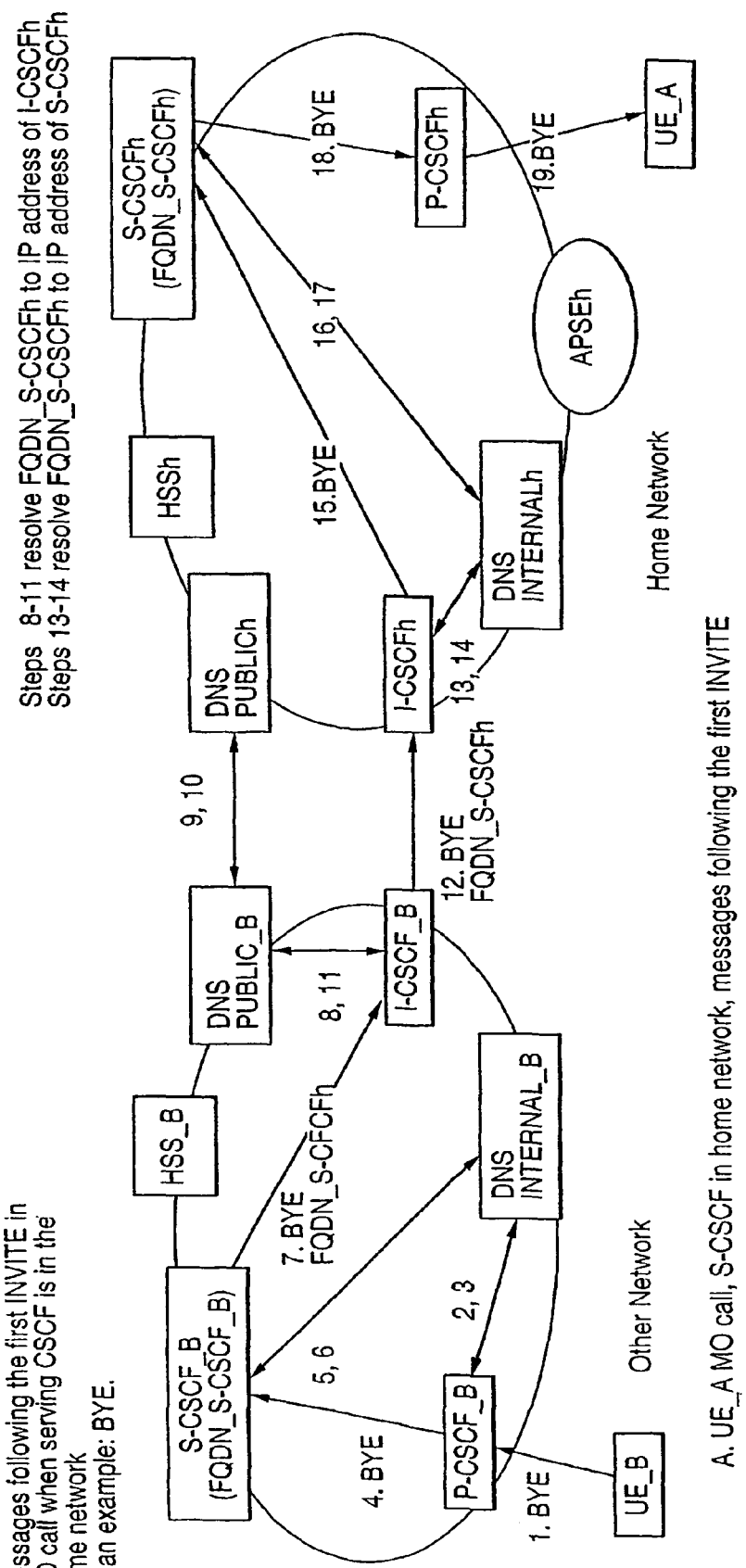
FIG. 6 illustrates messages following the first Invite in a mobile originated call when the S-CSCFh is in the home network, i.e. the home network model is used, and both the home as well as the other network are hidden utilizing the double semantics mechanism.

FIG. 6 illustrates messages following the first Invite in a mobile originated call when the S-CSCFh is in the home network, i.e. the home network model is used, and both the home as well as the other network are hidden utilizing the double semantics mechanism. The steps illustrated in the FIGS. 2-5 are self-explanatory and accordingly, a detailed description thereof has been omitted for the sake of brevity.

Figure 7:
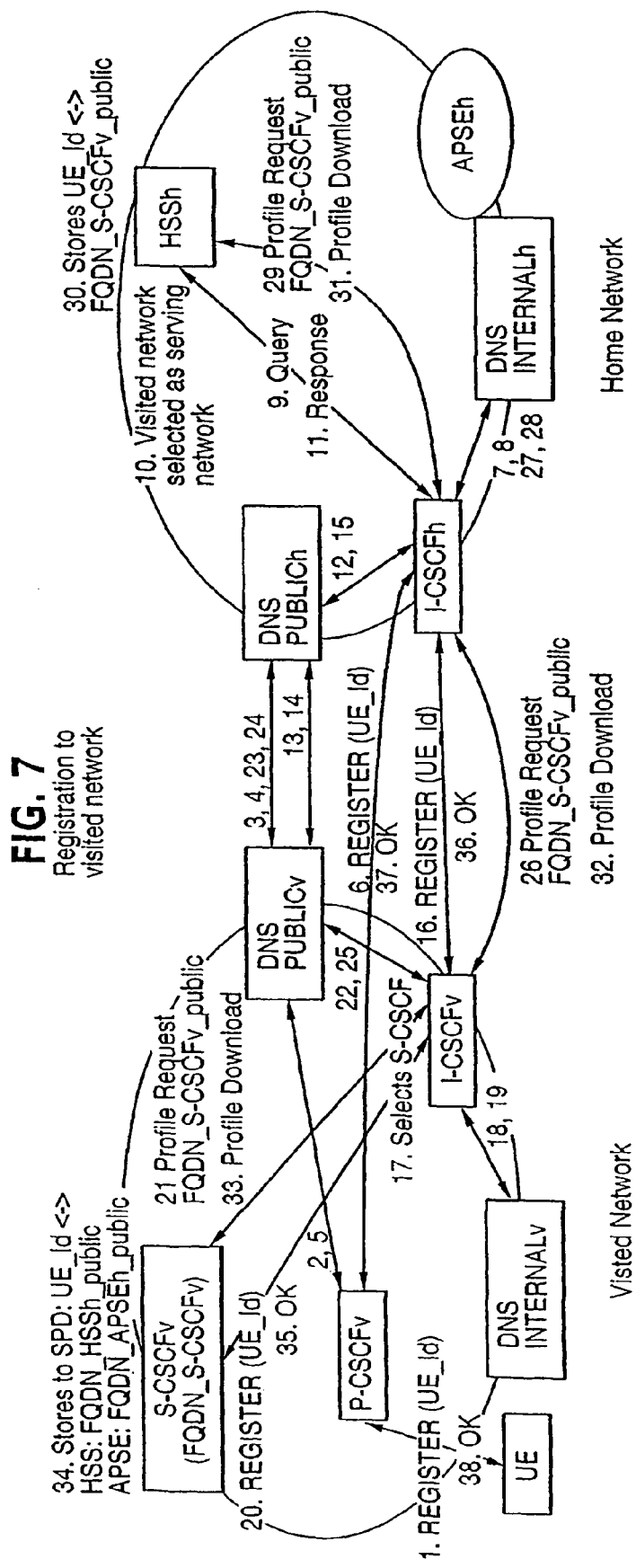
FIG. 7 illustrates registration of a mobile terminal to a visited network using the visited network model where the visited as well as the home network are hidden utilizing the one name for two routings (home modified) mechanism.

FIG. 7 illustrates registration of a mobile terminal to a visited network using the visited network model where the visited as well as the home network are hidden utilizing the one name for two routings (home modified) mechanism.

Figure 8:
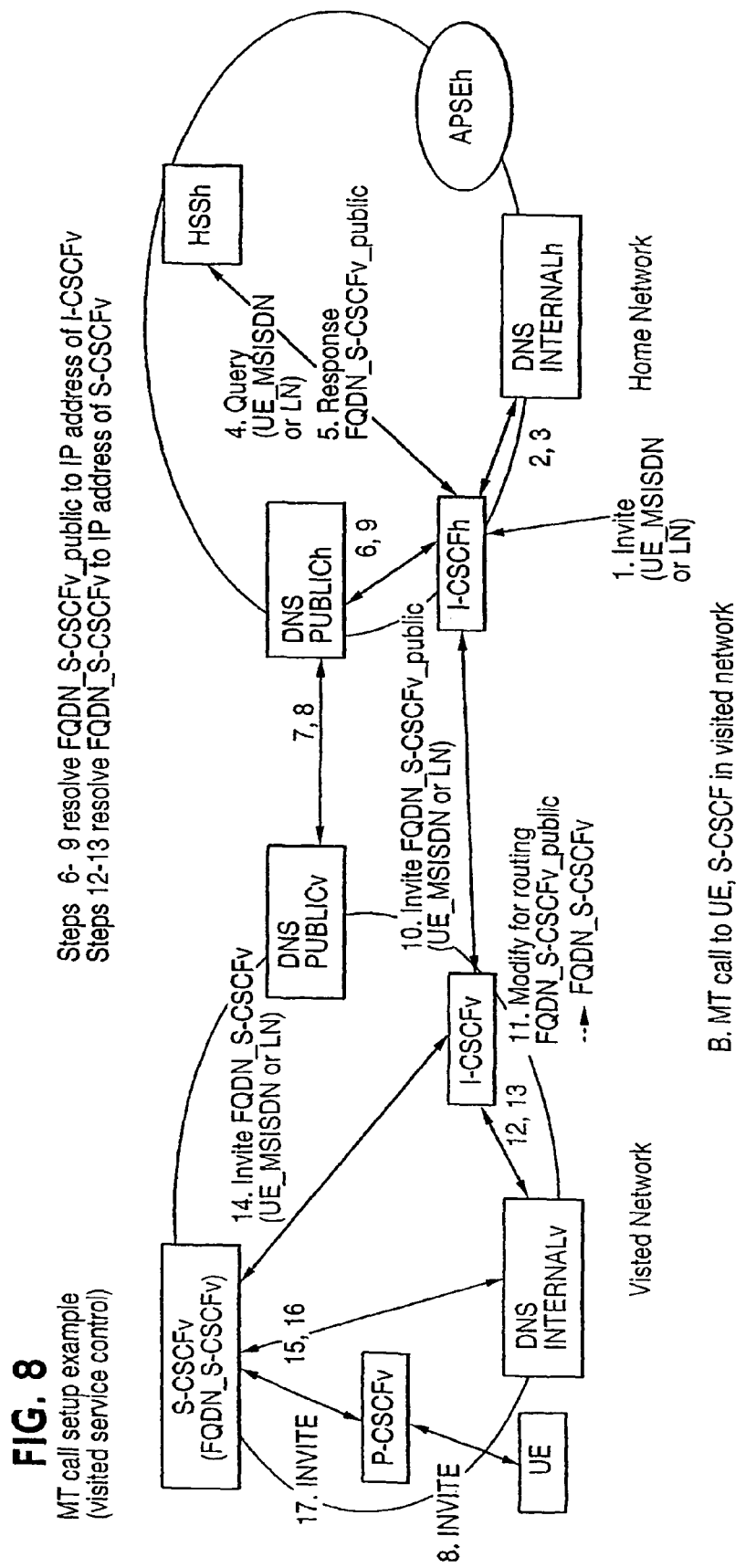
FIG. 8 illustrates a mobile terminated call setup example using the visited network model where the visited as well as the home network are hidden utilizing the one name for two routings (home modified) mechanism.

FIG. 8 illustrates a mobile terminated call setup example using the visited network model where the visited as well as the home network are hidden utilizing the one name for two routings (home modified) mechanism. As with FIGS. 3-6, the steps illustrated in the FIGS. 7-8 are self-explanatory and accordingly, a detailed description thereof has been omitted for the sake of brevity.

Figure 9:
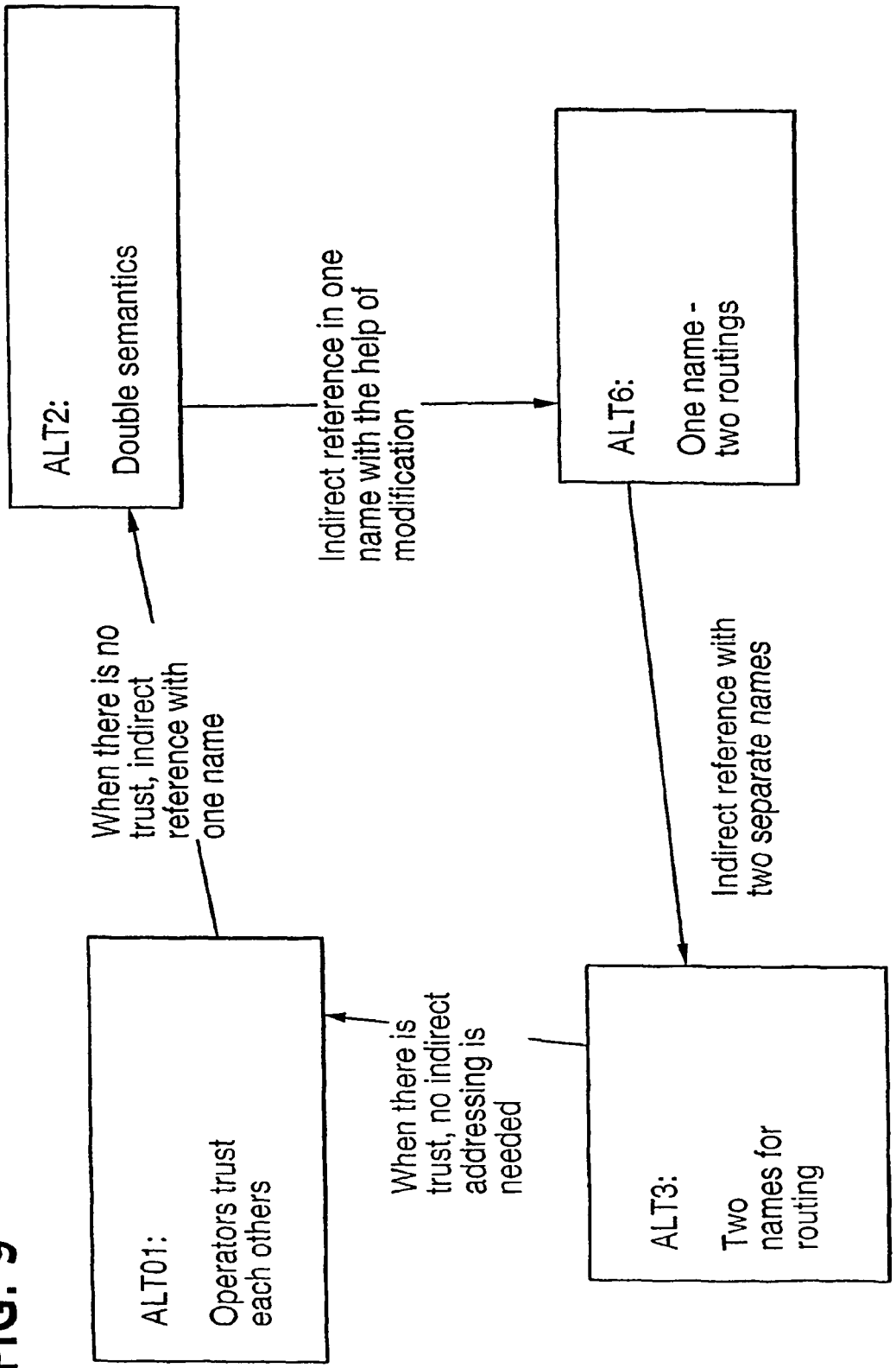
FIG. 9 illustrates the main characteristics of address hiding alternatives in accordance with embodiments of the present invention.

FIG. 9 illustrates the main characteristics of the address hiding alternatives in accordance with the present invention. Note that alternative ALT01 is not part of the invention but rather is the situation in which the operators of the first and second networks trust each other and therefore, neither network need be hidden. Where there is no trust, an indirect reference with one name may be used, that is, alternative ALT2, the double semantics embodiment of the present invention. Alternatively, the indirect reference with one name with the help of modification may be used, that is, alternative ALT6, the one name with two routings embodiment of the present invention. Furthermore, the indirect reference with two separate names may be used, that is, alternative ALT3, the two names for routing embodiment of the present invention.

Figure 10:
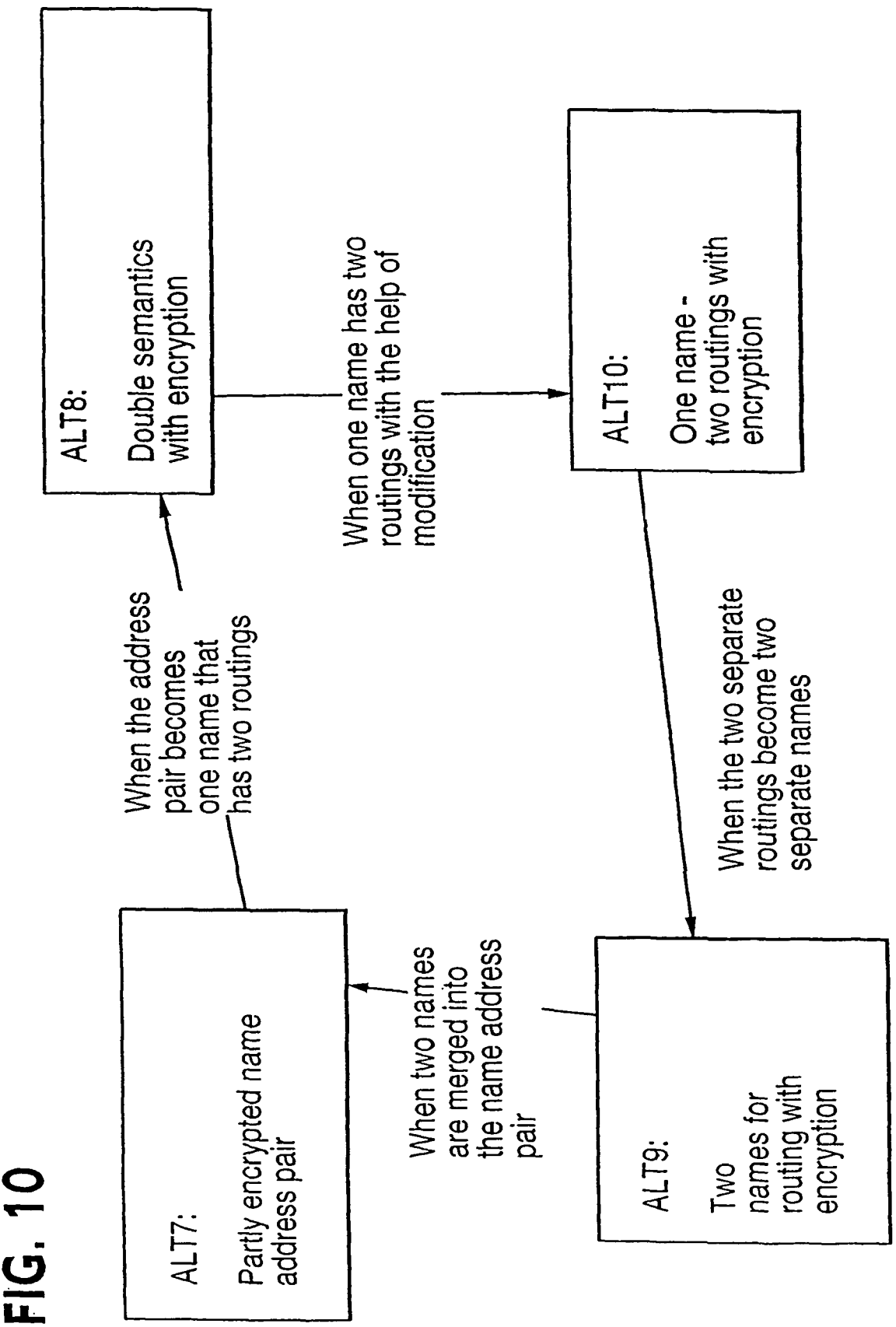
FIG. 10 illustrates the main characteristics of name hiding alternatives in accordance with embodiments of the present invention.

Similarly, FIG. 10 illustrates the main characteristics of the name hiding alternatives in accordance with the present invention. For example, an address pair which becomes one name that has two routings may be used, that is, alternative ALT8, the double semantics with encryption embodiment of the present invention. One name having two routings with a help of modification may be used, that is, alternative ALT10, the one name-two routings with encryption embodiment of the present invention. Alternatively, when the two separate routings become two separate names, alternative ALT9, the two names for routing with encryption embodiment of the present invention may be used and when two names are merged into the name address pair, alternative ALT7, that is, the partly encrypted name address pair embodiment of the present invention may be used.

This concludes the description of the example embodiments. Although the present invention has been described with reference to a number of illustrated embodiments thereof, it should be understood that numerous other modifications and embodiments can be devised by those skilled in the art that will fall within this spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

Furthermore, the various terms used throughout the specification and drawing figures are well-defined in the art and are publicly available at the WebSite of 3GPP at www.3gpp.org and the definitions of such various terms contained within this WebSite are incorporated by reference herein in their entirety. Furthermore, the SIP protocol are defined in RFC 2543 which is publicly available at numerous WebSites including www-.faqs.org/rfc/rfc2543.html and this reference is also incorporated by reference herein in its entirety.

What is claimed is:

1. A method, comprising:
   hiding at least one of network element names and addresses in communications between first and second networks, the hiding comprising
   providing a message generated by a network entity in the first network to be delivered to a target network entity in the second network, the message comprising first and second parts, wherein at least one of a network address and a name of said second network is hidden with respect to the first network but is identifiable by a contact point associated with the second network, wherein the second network is configured to receive and route the message via the contact point, wherein the first part of the message comprises a first name usable for routing external to the second network and wherein the second part of the message comprises a second name usable for routing only within the second network;
   routing the message generated by the network entity in the first network to a contact point disposed between the first and second networks in accordance with the first part of the message; and
   routing the message generated by the network entity in the first network from the contact point to the target network entity in the second network in accordance with the second part of the message.

2. The method of claim 1, wherein the first part of the message comprises a name resolvable external to the second network to a first address of the contact point and wherein the second part of the message comprises the name resolvable only within the second network to a second address of the target network entity.

3. The method of claim 2, further comprising: providing a domain name system for resolving a name to an address.

4. The method of claim 2, further comprising: providing a public domain name system infrastructure for resolving a name to an address of the contact point.

5. The method of claim 2, further comprising: providing one of a dedicated or an internal domain name system infrastructure for resolving a name to an address of a network entity in the second network.

6. The method of claim 1, wherein the first part of the message comprises a name that is encrypted and resolvable external to the second network to a first address of the contact point and wherein the second part of the message comprises the encrypted name resolvable only within the second network to a second address of the target network entity.

7. The method of claim 6, wherein the name is decoded before usage in the second network.

8. The method of claim 1, wherein the contact point comprises one of an interrogating call state control function or proxy-call state control function or a breakout gateway control function.

9. The method of any of claim 1-5 and 6-8, wherein the name comprises a logical name and the address comprises an internet protocol address.

10. The method of claim 1, wherein the name comprises a hostname and/or fully qualified domain name.

11. The method of claim 1, further comprising:
   providing internet protocol multimedia core network subsystem networks as the first and second networks.

12. The method of claim 1, where the second name is encrypted by the contact point of the second network with respect to an outgoing message.

13. The method of claim 1, where the second name is decrypted by the contact point of the second network before use.

14. The method of claim 1, where the second name is encrypted, and where the encrypted name is not utilized outside the second network, nor is it utilized within the second network.

15. The method of claim 1, where the first network is configured to provide the message using at least one of a contact point name and contact point address of the contact point associated with the second network.

16. The method of claim 15, wherein the second name is encrypted.

17. A system comprising:
   a first network including a network entity disposed therein;
   a second network including a target network entity disposed therein; and a contact point disposed between said first and second networks, wherein at least one of a network address and a name of said second network is hidden with respect to the first network but is identifiable by a contact point associated with the second network, wherein the second network is configured to receive and route the message via the contact point;
   wherein, upon said network entity generating a message comprising first and second parts to be delivered to said target network entity, said message is routed to said contact point in accordance with said first part of said message and then routed from said contact point to said target network entity in accordance with said second part of said message,
   wherein the first part of the message comprises a first name usable for routing external to the second network and wherein the second part of the message comprises a second name usable for routing only within the second network, wherein said first name comprises a name resolvable external to the second network to an address of said contact point and wherein said second name comprises said name resolvable only within said second network to an address of said target network entity, wherein said second name is encrypted.

18. The system of claim 17, wherein the second name is encrypted.

19. An apparatus, comprising:
receiving means for receiving a message generated by a network entity in a first network of a system including the first network having the network entity disposed therein and a second network including a target network entity disposed therein, wherein at least one of a network address and a name of said second network is hidden with respect to the first network but is identifiable by a contact point associated with the second network, wherein the second network is configured to receive and route the message via the contact point, the apparatus being disposed between said first and second networks; and
routing means for routing the message generated by the network entity in the first network to the target network entity in the second network in accordance with the second part of the message,
wherein, the network entity in the first network is configured to generate a message having first and second parts to the target network entity in the second network, the message being routed to the contact point in accordance with the first part of the message, the first part of the message comprises a first name usable for routing external to the second network and wherein the second part of the message comprises a second name usable for routing only within the second network.

20. The apparatus of claim 19, wherein the apparatus comprises one of an interrogating call state control function or proxy-call state control function or a breakout gateway control function.

21. The apparatus of claim 19, wherein the apparatus is configured to resolve a name to address by contacting a domain name system.

22. The apparatus of claim 19, wherein the apparatus is configured to resolve a name to address by contacting one of a dedicated or internal domain name system infrastructure.

23. The apparatus of claim 19, wherein the second name is encrypted.

24. An apparatus, comprising:
a receiver configured to receive a message generated by a network entity in a first network of a system having the first network having the network entity disposed therein and a second network including a target network entity disposed therein, the apparatus being disposed between said first and second networks, the message having first and second parts and being routed to the apparatus in accordance with the first part of the message, wherein at least one of a network address and a name of said second network is hidden with respect to the first network but is identifiable by the apparatus, wherein the second network is configured to receive and route the message via the apparatus, wherein the first part of the message comprises a first name usable for routing external to the second network and wherein the second part of the message comprises a second name usable for routing only within the second network; and
a router configured to route the message generated by the network entity in the first network to the target network entity in the second network in accordance with the second part of the message.

25. The apparatus of claim 24, wherein the first part of the message comprises a name usable for routing unmodified external to the second network and wherein the second part of the message comprises a modified version of the name usable for routing only within the second network.

26. The apparatus of claim 24, wherein the first part of the message comprises a name that is encrypted and resolvable external to the second network to a first address of the contact point and wherein the second part of the message comprises the encrypted name resolvable only within the second network to a second address of the target network entity.

27. The apparatus of claim 24, wherein the first and second networks comprise interne protocol multimedia core network subsystem networks.

28. The apparatus of claim 24, wherein the second name is encrypted.

* * * * *

UNITED STATES PATENT AND TRADEMARK OFFICE
CERTIFICATE OF CORRECTION

| | |
|---|---|
| PATENT NO. | : 8,127,016 B2 |
| APPLICATION NO. | : 10/398867 |
| DATED | : February 28, 2012 |
| INVENTOR(S) | : Westman et al. |

It is certified that error appears in the above-identified patent and that said Letters Patent is hereby corrected as shown below:

Claim 27, col. 14, line 40 delete "interne" and insert --internet--.

Signed and Sealed this
Fifteenth Day of May, 2012

David J. Kappos
*Director of the United States Patent and Trademark Office*